United States Patent
Hu et al.

(10) Patent No.: US 10,050,466 B2
(45) Date of Patent: Aug. 14, 2018

(54) DC-CHARGING POWER SOURCE ADAPTOR AND MOBILE TERMINAL

(71) Applicant: HISENSE MOBILE COMMUNICATIONS TECHNOLOGY CO., LTD., Qingdao (CN)

(72) Inventors: Ermeng Hu, Qingdao (CN); Rongyi Yin, Qingdao (CN); Wenjuan Du, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(*) Notice: Subject to any disclaimer, the term of this patent is extended or adjusted under 35 U.S.C. 154(b) by 234 days.

(21) Appl. No.: 15/051,851

(22) Filed: Feb. 24, 2016

(65) Prior Publication Data
US 2017/0040804 A1 Feb. 9, 2017

(30) Foreign Application Priority Data
Aug. 5, 2015 (CN) .......................... 2015 1 0473328

(51) Int. Cl.
*H02J 7/00* (2006.01)
*H02J 7/04* (2006.01)
*H02J 7/02* (2016.01)

(52) U.S. Cl.
CPC ............ *H02J 7/045* (2013.01); *H02J 7/022* (2013.01); *H02J 2007/0062* (2013.01); *H02J 2007/0096* (2013.01)

(58) Field of Classification Search
CPC ........................................................ H02J 7/00
(Continued)

(56) References Cited

U.S. PATENT DOCUMENTS 7,528,574 B1  5/2009  Adkins et al.
9,197,086 B2  11/2015 Zhou et al.
(Continued)

FOREIGN PATENT DOCUMENTS

CN  201590668 U  9/2010
CN  102570546 A  7/2012
(Continued)

OTHER PUBLICATIONS

Office Action from corresponding Chinese Application No. 201510473328.X, dated Jun. 13, 2017 (3 pages).
(Continued)

*Primary Examiner* — Mohammed Alam
(74) *Attorney, Agent, or Firm* — Harness, Dickey & Pierce, P.L.C.

(57) ABSTRACT

This disclosure relates to a DC-charging power source adaptor including a charging interface, an AC to DC converting unit, and a controlling unit; and the DC-charging power source adaptor is timed to communicate with a mobile terminal which is a charging object, to acquire a change in voltage of a battery in the mobile terminal and further adjust dynamically a volt value of charging voltage output by the DC-charging power source adaptor according to the change in voltage of the battery, and DC-charges the battery in the mobile terminal using the charging voltage.

20 Claims, 8 Drawing Sheets

(58) Field of Classification Search
USPC .......................................................... 320/162
See application file for complete search history.

(56) References Cited

U.S. PATENT DOCUMENTS

| | | | |
|---|---|---|---|
| 9,300,159 | B2 | 3/2016 | Sun et al. |
| 2005/0001590 | A1 | 1/2005 | Bayne et al. |
| 2007/0188134 | A1 | 8/2007 | Hussain et al. |
| 2008/0061733 | A1 | 3/2008 | Toya |
| 2008/0100143 | A1 | 5/2008 | Lipcsei |
| 2009/0184687 | A1 | 7/2009 | Schroeder et al. |
| 2010/0115147 | A1* | 5/2010 | Kim .................... H04M 1/6058 710/14 |
| 2011/0279078 | A1 | 11/2011 | Hara et al. |
| 2014/0015507 | A1 | 1/2014 | Park et al. |
| 2014/0167706 | A1 | 6/2014 | Sun et al. |
| 2014/0203761 | A1 | 7/2014 | Paparrizos et al. |
| 2016/0214500 | A1 | 7/2016 | Kim et al. |
| 2016/0261127 | A1* | 9/2016 | Worry ................ G01R 31/3624 |
| 2016/0336779 | A1* | 11/2016 | Hu ........................ H02J 7/0052 |
| 2017/0040804 | A1* | 2/2017 | Hu ........................ H02J 7/022 |
| 2017/0040805 | A1 | 2/2017 | Huang et al. |
| 2017/0040810 | A1* | 2/2017 | Hu ........................ H02J 7/0036 |
| 2017/0040812 | A1* | 2/2017 | Li ........................ H02J 7/0044 |
| 2017/0040821 | A1 | 2/2017 | Li et al. |
| 2017/0066342 | A1 | 3/2017 | Butler et al. |

FOREIGN PATENT DOCUMENTS

| | | |
|---|---|---|
| CN | 103236568 A | 8/2013 |
| CN | 103872398 A | 6/2014 |
| CN | 104393627 A | 3/2015 |
| CN | 104701937 A | 6/2015 |
| CN | 102880238 B | 7/2015 |
| CN | 104796011 A | 7/2015 |
| JP | 2007089309 A | 4/2007 |
| JP | 2007267498 A | 10/2007 |
| WO | WO-2012086788 A1 | 6/2012 |

OTHER PUBLICATIONS

Office Action from Chinese Application No. 201510473429.7 dated Dec. 8, 2016 (9 pages).
Office Action from Chinese Application No. 201510473429.7 dated Aug. 1, 2017 (8 pages).
Office Action from Chinese Application No. 201510473427.8 dated Oct. 27, 2016 (8 pages).
Office Action from Chinese Application No. 201510473427.8 dated May 17, 2017 (8 pages).
Office Action from Chinese Application No. 201510473336.4 dated Jan. 4, 2017 (10 pages).
U.S. Appl. No. 15/062,658, filed Mar. 7, 2016, Li et al.
U.S. Appl. No. 15/052,007, filed Feb. 24, 2016, Huang et al.
U.S. Appl. No. 15/051,799, filed Feb. 24, 2016, Li et al.

\* cited by examiner

DC-CHARGING POWER SOURCE ADAPTOR AND MOBILE TERMINAL

CROSS-REFERENCE TO RELATED APPLICATION

This application claims the benefit and priority of Chinese Patent Application No. 201510473328.X filed Aug. 5, 2015. The entire disclosure of the above application is incorporated herein by reference.

FIELD

The present disclosure relates to the field of Direct-Current (DC) charging and particularly to a power source adaptor for charging rapidly a battery in a mobile terminal.

BACKGROUND

This section provides background information related to the present disclosure which is not necessarily prior art.

At present, portable electronic products (or mobile terminals) have been widely applied in numerous aspects of people's life, and have become a leading factor in the development of the semiconductor industry. Moreover more and more types of portable electronic products are emerging, e.g., MP3, MP4, PMP, MID, mobile TV terminals, tablet computers, etc., along with the constant development of sciences and technologies, and these portable electronic products can provide audio and video playing, and other entertainment functions, and also provide navigation, an access to the Internet, business, disease diagnosis, and other service functions to thereby greatly facilitate people's life.

For the sake of portability, the portable electronic products are generally provided with chargeable batteries built in the products to power system circuits in the products. At present the batteries have been widely charged in two general schemes: in one of the schemes, the batteries are charged by a specialized power source adaptor (charger), i.e., in the standard DCP charging scheme, where the power source adaptor generally supports an output of only fixed voltage, e.g., 5V, 9V, 12V, etc., so that the output voltage may not be selectable flexibly, and it may take a long period of time to charge the batteries, for example, it typically takes 3 to 4 hours to charge a drained battery of a handset until the battery is fully charged; and in the other scheme, the batteries are charged by a host (e.g., a computer, etc.), i.e., in the SDP charging scheme.

SUMMARY

This section provides a general summary of the disclosure, and is not a comprehensive disclosure of its full scope of all of its features.

This disclosure provides a DC-charging power source adaptor including a charging interface, an AC to DC converting unit, and a controlling unit, wherein the charging interface is configured to be connected with a mobile terminal, and including a power source pin, a ground pin, and two communication pins shorted by default; the AC to DC converting unit is configured to convert an external AC input power source into charging voltage required for the mobile terminal, and to output the charging voltage via the charging interface; and the controlling unit, connected with the charging interface, is configured to control the two communication pins of the charging interfaces to be disconnected from each other upon detecting that the charging interface is connected with the mobile terminal, and to communicate with the mobile terminal through the two communication pins to adjust the charging voltage output by the AC to DC converting unit.

This disclosure further provides a mobile terminal including: a communicating and receiving interface configured to communicate with a DC-charging power source adaptor to send a change in voltage of a battery in the mobile terminal to the DC-charging power source adaptor so that the DC-charging power source adaptor adjusts dynamically a volt value of charging voltage output by the DC-charging power source adaptor according to the change in voltage, and to receive the charging voltage input by the DC-charging power source adaptor; and a sending unit to send a specific pulse waveform to the DC-charging power source adaptor after the mobile terminal is connected with the DC-charging power source adaptor.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

This disclosure proposes a DC-charging power source adaptor outputting dynamically adjustable voltage to address such a problem that if a mobile terminal in which a chargeable battery is built is charged, then charging voltage output by a normal power source adaptor is constant, and charging current has to be controlled by a power source managing chip not to be too high, typically below 1.5 A, so it may take a long period of time to charge the drained battery until the battery is fully charged. The DC-charging power source adaptor can exchange data with the mobile terminal to be charged in the UART (Universal Asynchronous Receiver/Transmitter) communication mode, adjust duly a voltage value of the charging voltage output by the DC-charging power source adaptor according to a change in voltage of the battery being charged, and DC-charge the battery in the mobile terminal using the dynamically changing charging voltage, so that the battery in the mobile terminal can be charged at higher voltage to thereby maintain the charging current at a higher current value, typically up to approximately 4 A, and the battery can be charged directly at the larger current to thereby significantly speed up charging and greatly shorten the period of time for charging.

Firstly hardware configurations of the DC-charging power source adaptor and the mobile terminal which can be charged by the DC-charging power source adaptor will be described below.

Figure 1:
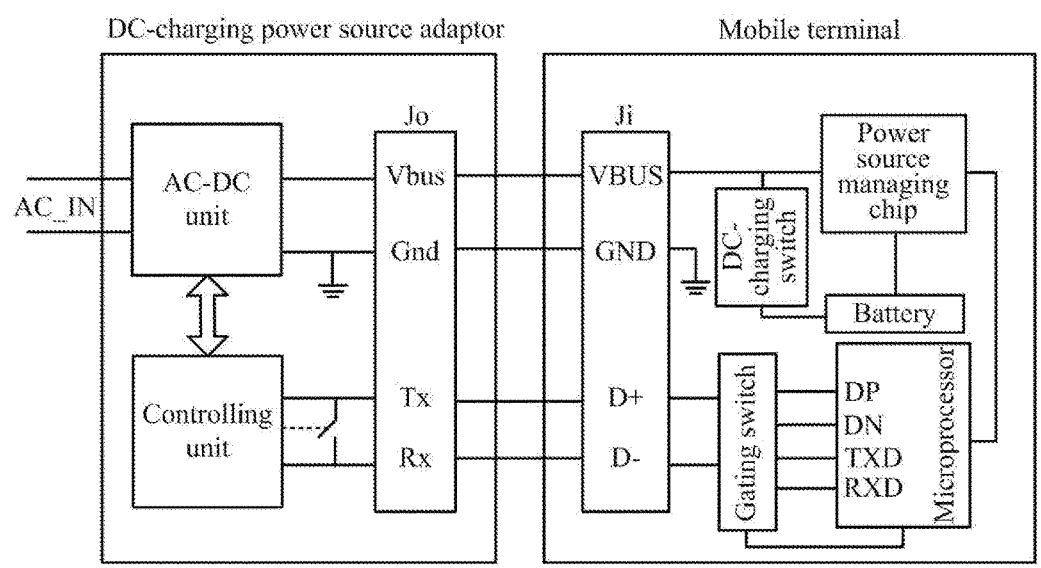
FIG. 1 is a circuit scheme block diagram of an embodiment of a mobile terminal and a DC-charging power source adaptor, both of which are connected, according to this disclosure.

As illustrated in FIG. 1, in order to maintain the existing traditional charging function of the mobile terminal so that the mobile terminal can be normally plugged in and charged by the existing host and normal power source adaptor, the existing charging interface of the mobile terminal is maintained in this embodiment, e.g., the currently widely applied USB interface Ji (for both charging and transmitting data), so that the mobile terminal can be plugged in and powered by the normal power source adaptor and computer host in the market, which are currently manufactured by the majority of the manufactures. For the power source pin VBUS in the USB interface Ji, in this embodiment, one branch thereof is connected with a power source managing chip in the mobile terminal, and another branch thereof is connected with the battery through a DC-charging switch, where the DC-charging switch can be any type of controllable switch element with low conduction impedance and supporting large current to pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with a systematical ground of the mobile terminal so that the mobile terminal can be grounded together with the external charging device if the mobile terminal is plugged in the external device. For the differential data pins D+ and D− in the USB interface Ji, they are designed to be connected with the microprocessor through a gating switch, where the gating switch can be a double-pole double-throw switch, to receive a control signal output by the microprocessor, where the differential data pins D+ and D− of the USB interface Ji are connected by default with the differential data interfaces DP and DN of the microprocessor through the gating switch; and if it is detected that the differential data pins D+ and D− of the USB interface Ji are shorted, then the gating switch will be controlled by the microprocessor to switch the differential data pins D+ and D− of the USB interface Ji to be connected with the UART interfaces TXD and RXD of the microprocessor to thereby identify whether the externally connected charging device is the normal power source adaptor or the DC-charging power source adaptor. The microprocessor in the mobile terminal can be designed to conduct UART communication with the externally connected power source adaptor after the differential data pins D+ and D− of the USB interface Ji are switched to be connected with the UART interfaces TXD and RXD of the microprocessor, and if the communication succeeds, to determine that the inserted external device is the DC-charging power source adaptor; otherwise, to determine that the inserted external device is the normal power source adaptor.

In this embodiment, the DC-charging power source adaptor is configured in the UART communication mode instead of the I2C bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the DC-charging power source adaptor to thereby improve the safety of the mobile terminal being charged.

Of course, if the instability above is not taken into account, then communication between the mobile terminal and the DC-charging power source adaptor can be designed in another communication mode than UART (e.g., the I2C bus communication mode, etc.) although this embodiment will not be limited thereto.

Figure 2:
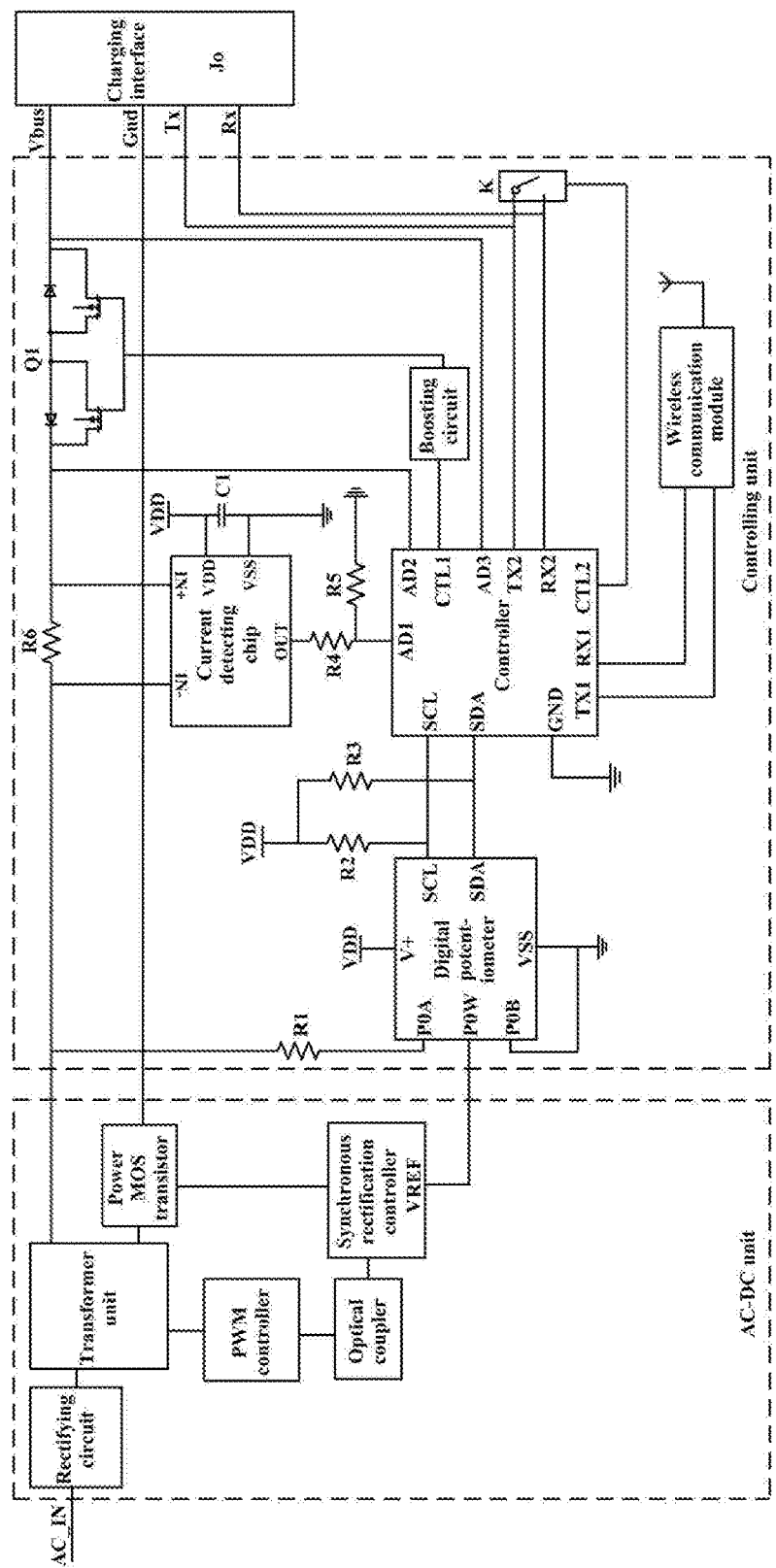
FIG. 2 is a circuit scheme diagram of an embodiment of the DC-charging power source adaptor in FIG. 1.

FIG. 2 illustrates a schematic diagram of circuit components of a DC-charging power source adaptor supporting UART communication, where the DC-charging power source adaptor generally includes three components, i.e., a charging interface Jo, a controlling unit, and an AC-DC (converting) unit, as illustrated in FIG. 1 as well, where a power source pin Vbus, a ground pin Gnd, and two communication pins Tx and Rx are arranged in the charging interface Jo. The power source pin Vbus configured to transmit a charging power source is connected with the AC-DC unit to transmit a DC power source output by the AC-DC unit to the power source pin VBUS of the USB interface Ji of the mobile terminal to charge the mobile terminal. The ground pin Gnd is connected with the system ground of the DC-charging power source adaptor, and after the DC-charging power source adaptor is plugged in the mobile terminal, the ground pin Gnd is connected with the ground pin GND of the USB interface Ji of the mobile terminal so that both of the ground pins are grounded together. The two communication pins Tx and Rx of the charging interface Jo are shorted by default, and connected with the respective UART interfaces TX and RX of the controlling unit.

If the controlling unit detects that the DC-charging power source adaptor is plugged in the mobile terminal, and after delaying a preset period of time (the preset period of time can be determined as a function of a period of time from when the mobile terminal detects an external device being inserted to when the mobile terminal detects that the differential data pins D+ and D− thereof are shorted), then the controlling unit may control the two communication pins Tx and Rx of the charging interface Jo to be switched from being shorted by default to be disconnected from each other, and then send a communication command on its own initiative to the mobile terminal through the UART interfaces TX and RX thereof, conduct UART communication with the mobile terminal to exchange a handshake instruction with each other, receive control information sent by the mobile terminal if the handshake succeeds, and further adjust the volt value of the charging voltage output by the AC-DC unit according to the control information so that the mobile terminal can be charged differently as required in different phases. Of course, the mobile terminal can alternatively be configured to be timed to send a UART communication command to the externally connected power source adaptor, and to wait for a response command fed back by the DC-charging power source adaptor, in a preset wait period of time after the differential data pins D+ and D− of the USB interface Ji are switched to be connected with the UART interfaces TXD and RXD of the microprocessor of the mobile terminal, and if a valid response command is received in the wait period of time, to determine that the external device is the DC-charging power source adaptor; otherwise, to determine that the external device is the normal power source adaptor. In this embodiment, the wait period of time shall be longer than the preset period of time so that the DC-charging power source adaptor can receive and respond to the UART communication command sent by the mobile terminal, after the communication pins Tx and Rx of the DC-charging power source adaptor are disconnected from each other.

Of course the controlling unit can alternatively be designed to further control the two communication pins Tx and Rx of the charging interface Jo to be switched to be connected with or disconnected from each other, upon reception of a specific pulse waveform sent by the mobile terminal. The controlling unit can be configured to firstly configure by default the UART interfaces TX and RX thereof to receive an input, and if the mobile terminal detects that the externally inserted device is a power source adaptor, and the microprocessor of the mobile terminal switches the UART interfaces TXD and RXD thereof to be connected with the differential data pins D+ and D− of the USB interface Ji, then firstly the specific pulse waveform will be output by the microprocessor to the externally connected power source adaptor. If the externally connected power source adaptor is the normal power source adaptor, then no response will be made to the specific pulse waveform. If the externally connected power source adaptor is the DC-charging power source adaptor, then the controlling unit in the DC-charging power source adaptor will receive the specific pulse waveform even if the communication pins Tx and Rx are shorted because the UART interfaces TX and RX of the controlling unit are configured to receive an input. The controlling unit switches the communication pins Tx and Rx of the charging interface Jo from being shorted by default to be disconnected from each other, and recover the communication interface function of the UART interfaces TX and RX of the controlling unit, upon reception of the specific pulse waveform. In order to enable DC-charging power source adaptors of different models to receive reliably the specific pulse waveform, the microprocessor in the mobile terminal can be configured to send constantly the specific pulse waveform for a preset period of time which can be determined as a function of a period of time from when the DC-charging power source adaptor receives the specific pulse waveform to when the DC-charging power source adaptor controls the communication pins Tx and Rx thereof to be connected with or disconnected from each other. Thereafter the microprocessor initiates a communication command on its own initiative to the externally connected power source adaptor in the UART communication mode, and if a valid command fed back by the external power source adaptor is received, then the microprocessor determines that the external device is the DC-charging power source adaptor, and starts the rapid charging mode; and if there is no valid command fed back, then the microprocessor determines that the external device is the normal power source adaptor, and at this time the microprocessor disconnects the UART interfaces TXD and RXD thereof from the differential data pins D+ and D− of the USB interface Ji, and starts the standard DCP charging mode.

In order to adjust dynamically the charging voltage output by the AC-DC unit, in this embodiment, a rectifying circuit, a transformer unit, a synchronous rectification controller, a PWM controller, an optical coupler, a power MOS transistor, and other elements are designed in the AC-DC unit; and a controller, a digital potentiometer, a current detecting chip, a boosting circuit, and other elements are designed in the controlling unit, as illustrated in FIG. 2, where the rectifying circuit receives an AC input power source AC_IN provided by a mains grid, rectifies the AC input power source into a DC power source, and outputs the DC power source to the transformer unit for transformation into the charging voltage to charge the mobile terminal. The UART interfaces TX2 and RX2 of the controller are connected with the communication pins Tx and Rx of the charging interface Jo through two signal lines across which a switch K is connected, where the switch is closed by default to short the communication pins Tx and Rx. If the controller receives the specific pulse waveform, or if the controller detects that the DC-charging power source adaptor is plugged in the mobile terminal and after delaying a preset period of time (dependent upon the configuration of the controller), then the controller will output a control signal to the switch K through an interface CTL2 (e.g., a branch of GPIO interface) of the controller to control the switch K to be opened, and further create a UART communication line between the DC-charging power source adaptor and the mobile terminal.

In this embodiment, the magnitude of the charging current output through the power source pin Vbus of the charging interface Jo can be detected to thereby determine whether the DC-charging power source adaptor is connected with the mobile terminal. If the DC-charging power source adaptor is not connected with the mobile terminal, then the charging current output through the power source pin Vbus may be substantially zero. If the DC-charging power source adaptor is connected with the mobile terminal, then there may be some charging current even if the battery of the mobile terminal is fully charged. Thus the DC-charging power source adaptor can determine from the magnitude of the charging current whether it is connected with the external mobile terminal.

In order to adjust the output voltage of the AC-DC unit, in this embodiment, the digital potentiometer is designed in the controlling unit to be connected with the controller. The controller generates a voltage adjusting instruction according to the received control information, and sends the voltage adjusting instruction to the digital potentiometer to change the resistance value of a valid resistor of the digital potentiometer. In this embodiment, the controller can be connected and communicates with the digital potentiometer over an I2C bus, as illustrated in FIG. 2, to transmit the voltage adjusting instruction. In order to ensure the stability of transmission of the signal, in this embodiment, a voltage pull-up circuit is further connected over the I2C bus, for example, a clock line SCL and a data line SDA of the I2C bus are connected with a DC power source VDD respectively through pull-up resistors R2 and R3 to thereby improve the anti-interference capability of the transmission of the signal.

The DC power source VDD can be embodied as a set of small electromagnetic coils designed separately in the transformer unit. The ratio of the number of turns of a primary coil and the number of turns of a secondary coil in the set of small electromagnetic coils is configured to transform the DC power source output by the rectifying circuit into the desirable DC power source VDD to power those components in the DC-charging power source adaptor to provide the components with desirable DC operating voltage, e.g., the controller, the digital potentiometer, the current detecting chip, and other components to thereby enable them to operate.

The digital potentiometer is a resistance-adjustable resistor element in which a resistor body is built. In this embodiment, the resistor body connected in series with a current-limiting resistor R1 is connected between the anode of a secondary coil in another set of electromagnetic coils (referred below simply to as the other set of electromagnetic coils) in the transformer unit and the ground. One end P0A of the resistor body is connected with the anode of the secondary coil in the other set of electromagnetic coils through the current-limiting resistor R1 connected in series, and the other end P0B of the resistor body is grounded. An intermediate tap POW of the resistor body is connected with a reference voltage pin VREF of the synchronous rectification controller, and if the resistance value of the valid resistor of the digital potentiometer varies, then the volt value of the charging voltage output by the other set of electromagnetic coils in the transformer unit will be adjusted in order to maintain the reference voltage on the reference voltage pin VREF of the synchronous rectification controller. In order to adjust the volt value of the charging voltage, the synchronous rectification controller adjusts its output control signal according to the varying resistance value of the valid resistor of the digital potentiometer, and transmits the control signal to the PWM controller after the control signal is optic-electrically isolated by the optical coupler, to thereby adjust a duty ratio of a PWM signal output by the PWM controller. The PWM signal is transmitted to the transformer unit, and can be transmitted to a switch transistor connected in series with a primary coil in the other set of electromagnetic coils, to control the switch transistor to be switched on or off to thereby adjust the switching timing of the other set of electromagnetic coils so as to further adjust the volt value of the charging voltage output by the secondary coil thereof for the purpose of adjusting dynamically the charging voltage.

In this embodiment, the charging voltage output by the transformer unit can be finely adjusted in the range of 3.6V to 12V to thereby charge different mobile terminals as required in reality.

In order to achieve the stability of the charging voltage output by the transformer unit, in this embodiment, instead of using a traditional rectification scheme in which a diode is connected in series on a charging voltage transmission line, the power MOS transistor is connected on the charging voltage transmission line and is switched on or off based on the switching signal output by the synchronous rectification controller to thereby shape the waveform of the charging voltage output by the transformer unit.

In this embodiment, the power MOS transistor can be embodied as an NMOS transistor connected between the cathode of the secondary coil in the other set of electromagnetic coils and the ground pin Gnd of the charging interface Jo. Since the DC-charging power source adaptor supports an output of large current, if the charging voltage output by the transformer unit is shaped by the diode, then power consumption of the DC-charging power source adaptor may be increased and the efficiency in charging may be lowered due to a significant voltage drop across the conducting diode. In this embodiment, the charging voltage is shaped by the power MOS transistor, and since the power MOS transistor has low inner resistance and supports large current passing, systematic power consumption of the DC-charging power source adaptor can be lowered effectively and the efficiency in charging the mobile terminal can be improved.

In order to detect in real time charging current output by the transformer unit to thereby improve the safety in charging, in this embodiment, a sampling resistor R6 is further connected in series in the transmission line of the charging current, as illustrated in FIG. 2, possibly between the anode of the secondary coil in the other set of electromagnetic coils in the transformer unit and the power source pin Vbus of the charging interface Jo. Inputs −IN and +IN of the current detecting chip are connected with two ends of the sampling resistor R6 to acquire a voltage drop across the resistor R6, and after the voltage drop is amplified, the magnitude of the charging current is calculated according to the voltage drop and the resistance value of the sampling resistor R6. The current detecting chip generates sample voltage corresponding to the calculated magnitude of the charging current, and transmits the sample voltage to an ADC interface AD1 of the controller through an output OUT thereof, and the sample voltage is analog-to-digital converted by the controller into the magnitude of the charging current, so the controller can detect in real time the charging current.

If the range of the amplitude of the sample voltage output by the current detecting chip exceeds an interface voltage range specified for the ADC interface AD1 of the controller, then the ADC interface of the controller may be damaged. In order to protect the controller, a voltage dividing circuit can be additionally arranged between the output OUT of the current detecting chip and the ADC interface AD1 of the controller, e.g., a resistor voltage dividing circuit composed of resistors R4 and R5, to adjust the voltage signal output by the current detecting chip within the interface voltage range acceptable to the AD1 interface of the controller so as to avoid the ADC interface AD1 of the controller from being damaged due to the input voltage being too high.

In order to improve the safety in charging so that the DC-charging power source adaptor can have the charging power source disconnected rapidly upon abnormal charging occurring to thereby avoid the mobile terminal from being damaged, in this embodiment, a switch transistor Q1 supporting large current passing is further arranged in the charging power source transmission line of the DC-charging power source adaptor so that a switch voltage, generated by the boosting circuit, sufficient to drive the switch transistor Q1 to be switched on is transmitted to a control pole of the switch transistor Q1 to control the switch transistor Q1 to be switched on or off to thereby have the charging power source transmission line connected or disconnected.

In this embodiment, the switch transistor can be embodied as a pair of NMOS transistors Q1 in which parasitic diodes connected in anti-parallel are built, as illustrated in FIG. 2. The switch path of the pair of NMOS transistors Q1 are connected in series in the transmission line of the charging power source, where the sources of the two NMOS transistors in the pair of NMOS transistors Q1 can be connected with each other, the drains of the two NMOS transistors can be connected respectively with the anode of the secondary coil in the other set of electromagnetic coils in the transformer unit, and the power source pin Vbus of the charging interface Jo; and then the gates of the two NMOS transistors can be connected with the boosting circuit. An enable end of the boosting circuit is connected with the controller to receive an enable signal output by the controller. During charging, if the controller detects normal charging current, then the controller may output the valid enable signal to control the boosting circuit to be enabled into operation to boost the DC power source output by the transformer unit to the switch voltage higher than the volt value of the charging voltage, and the switch voltage is output to the gates of the pair of NMOS transistors Q1 to control the pair of NMOS transistors Q1 to be switched on to have the transmission line of the charging power source connected, so that the charging power source can be output to the externally connected mobile terminal to charge the battery in the mobile terminal. If the controller detects abnormal charging current or receives control information sent by the mobile terminal to stop charging, then the controller may output the invalid enable signal to control the boosting circuit to stop operating. At this time the pair of NMOS transistors Q1 is switched off due to the disappearing voltage at the gates thereof, to thereby have the transmission line of the charging power source disconnected to block the charging power source from outputting to the outside, so that the DC-charging power source adaptor can be controlled to stop powering the mobile terminal.

At the mobile terminal side, in order to enable the mobile terminal in which the chargeable battery is built, to identify automatically and accurately the type of the currently inserted external device so as to invoke different charging management modes for different charging characteristics of different external devices to thereby make reasonable use of charging resources, this disclosure proposes a charging method as described below for the host and the normal power source adaptor, and the DC-charging power source adaptor according to this embodiment, in addition to the circuitry modifications as illustrated in FIG. 1 for the hardware configuration of the mobile terminal.

Figure 3:
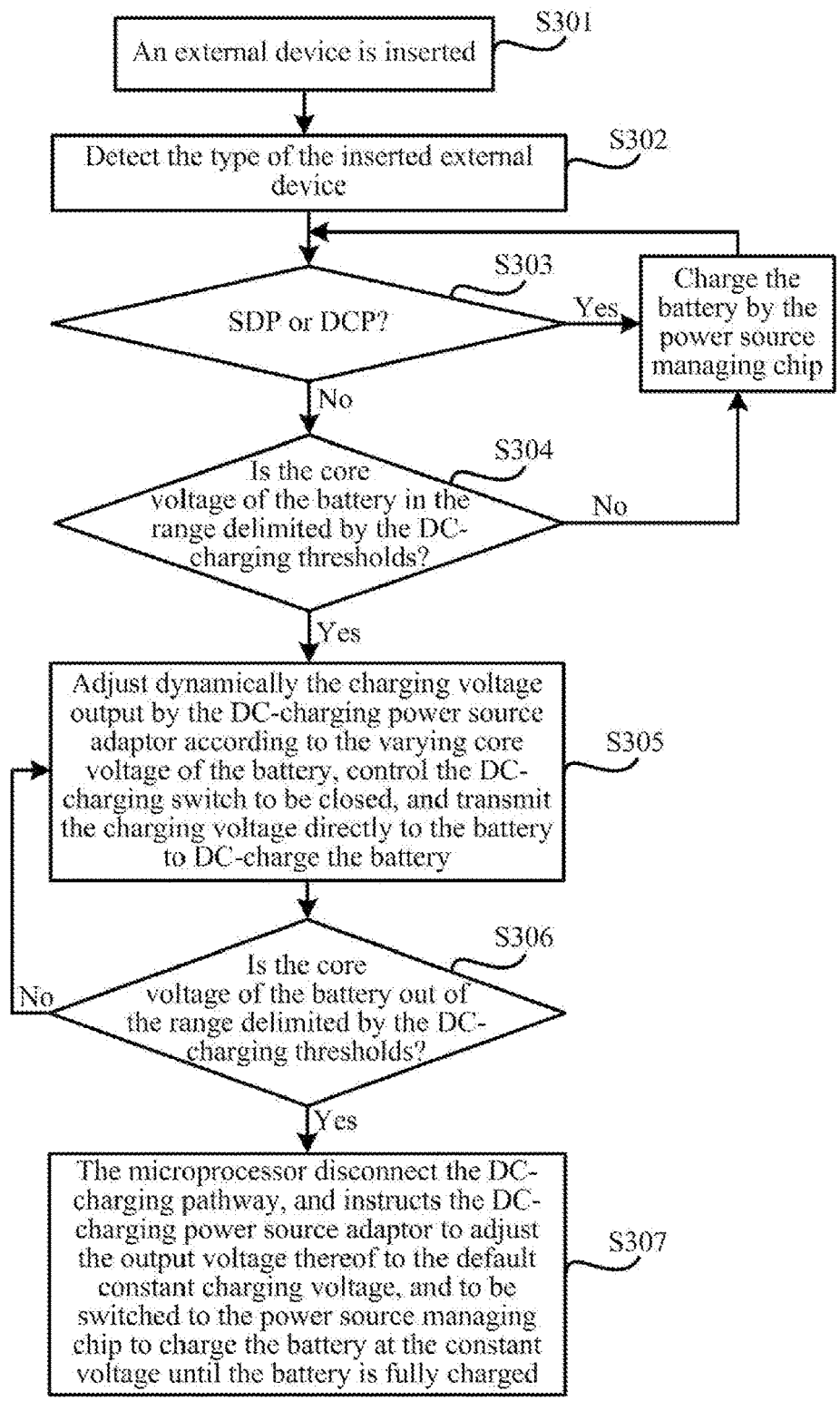
FIG. 3 is a flow chart of a process of a charging method designed for the mobile terminal illustrated in FIG. 1.

As illustrates in FIG. 3, a charging method generally involves the following operations:

S301. The mobile terminal detects whether an external device is inserted, and performs subsequent operations upon detecting an inserted external device.

In this embodiment, detection of whether an external device is inserted can be performed as in the prior art, for example, by detecting whether a DC power source is connected to the power source pin VBUS of the USB interface Ji of the mobile terminal. In the traditional host charging mode SDP and normal power source adaptor charging mode DCP, the charging voltage output by the host and the normal power source adaptor is typically 5V; and the DC-charging power source adaptor can be configured to output by default the same constant charging voltage as the host and the normal power source adaptor, e.g., 5V constant charging voltage so that the mobile terminal can substantially determine whether the DC-charging power source adaptor is inserted.

Of course the 5V constant charging voltage here only relates to an embodiment, and for some mobile terminal to be charged at constant voltage of another volt value, the DC-charging power source adaptor will be simply configured to output by default the same constant charging voltage as the charging voltage output by the normal power source adaptor when the normal power source adaptor powers the mobile terminal.

S302. The mobile terminal detects the type of the inserted external device.

In this embodiment, the mobile terminal operates by default without being DC-charged, that is, the microprocessor in the mobile terminal controls by default the DC-charging switch to be opened to have the power source pin VBUS of the USB interface Ji connected with the power source managing chip. Also the microprocessor controls the gating switch to be kept in the default state to have the differential data pins D+ and D− of the USB interface Ji connected with the differential data interfaces DP and DN of the microprocessor.

Whether the inserted external device is the host or the normal power source adaptor can be determined as in the existing BC1.2 charging type detection scheme. Of course this can alternatively be determined as follows:

If the mobile terminal detects that an external device is inserted into the charging interface thereof, then the microprocessor firstly determines whether the differential data pins D+ and D− of the USB interface Ji are shorted, and if the differential data pins D+ and D− are not shorted, then the mobile terminal determines that the inserted external device is the host because the existing host (e.g., the computer host) typically is connected and communicates with and powers the mobile terminal through the USB data line. Of course the mobile terminal can further conduct USB communication with the externally inserted external device via the differential data interfaces DP and DN of the microprocessor to further determine whether the inserted external device is the host. If it is detected that the differential data pins D+ and D− of the USB interface Ji are shorted, then the mobile terminal determines that the inserted external device is a power source adaptor because the communication pins of the existing normal power source adaptor typically are configured to be shorted. Moreover in this embodiment, in order to be identified by the mobile terminal in the same way as the normal power source adaptor, the communication pins Tx and Rx of the DC-charging power source adaptor can also be configured to be shorted by default. If the mobile terminal determines that the inserted external device is a power source adaptor, then the mobile terminal can communicate with the externally connected power source adaptor to further determine whether the inserted external device is the normal power source adaptor or the DC-charging power source adaptor. If the microprocessor detects that the differential data pins D+ and D− of the USB interface Ji of the mobile terminal are shorted, then the microprocessor firstly controls the gating switch to operate to switch the differential data pins D+ and D− of the USB interface Ji to be connected with the UART interfaces TXD and RXD of the microprocessor. Then the microprocessor outputs a specific pulse waveform to the externally connected power source adaptor through the UART interfaces TXD and RXD of the microprocessor in a preset period of time. After the preset period of time expires, the microprocessor initiates a communication command on its own initiative to the externally connected power source adaptor in the UART communication mode, and if a valid response command fed back by the externally connected power source adaptor is received, then the microprocessor determines that the inserted external device is the DC-charging power source adaptor (because at this time the DC-charging power source adaptor has the communication pins Tx and Rx of the charging interface Jo thereof switched from being shorted to be connected with the UART interfaces TX2 and RX2 of the controller thereof); otherwise, the microprocessor determines that the inserted external device is the normal power source adaptor.

Of course, the microprocessor can alternatively determine this as follows: after the microprocessor controls the UART interfaces TXD and RXD thereof to be connected with the respective differential data pins D+ and D− of the USB interface Ji, the microprocessor waits for reception of a UART communication command initiated by the DC-charging power source adaptor on its own initiative. If the UART communication command is received in a preset wait period of time, then the mobile terminal determines that the inserted external device is the DC-charging power source adaptor; otherwise, the mobile terminal determines that the inserted external device is the normal power source adaptor. Alternatively the microprocessor is timed to send a UART communication command to the externally connected power source adaptor, and waits for a response command fed back by the external power source adaptor, in a preset wait period of time, and if a valid response command is received, then the mobile terminal determines that the inserted external device is the DC-charging power source adaptor; otherwise, the mobile terminal determines that the inserted external device is the normal power source adaptor.

Figure 4:
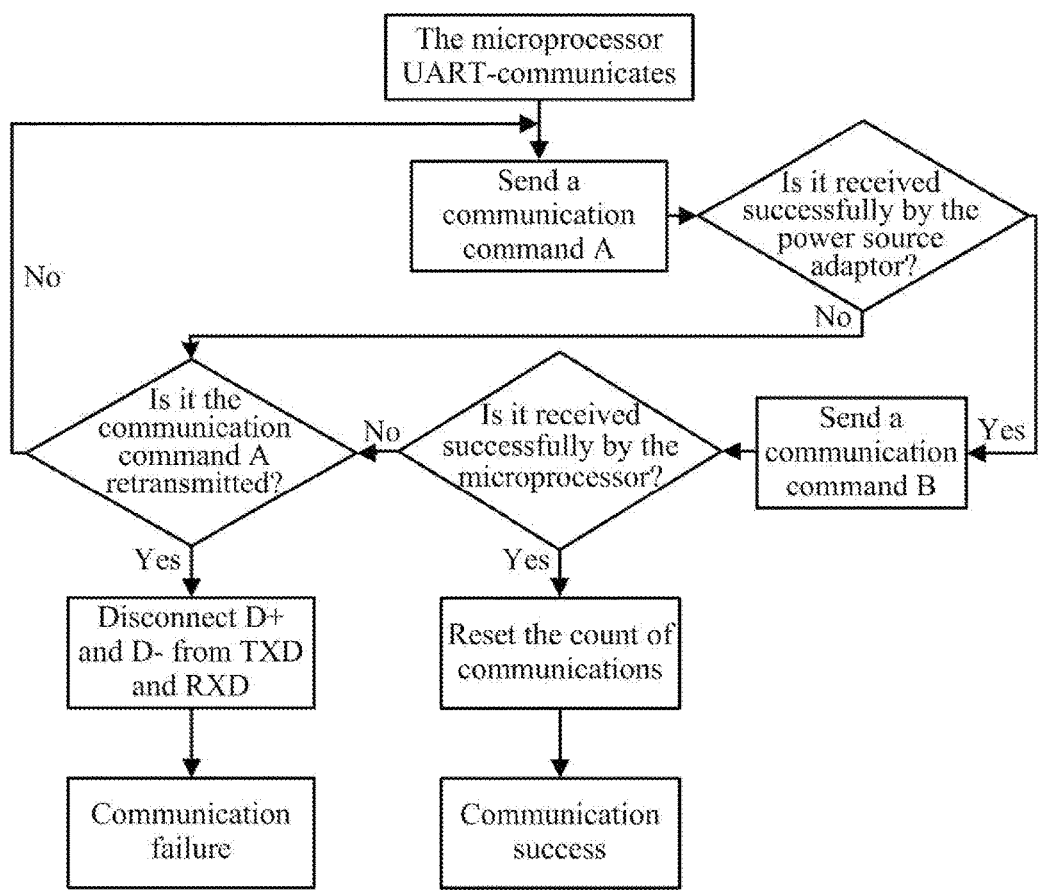
FIG. 4 is a flow chart of an embodiment of detecting communication between the mobile terminal and the DC-charging power source adaptor illustrated in FIG. 1.
Figure 5:
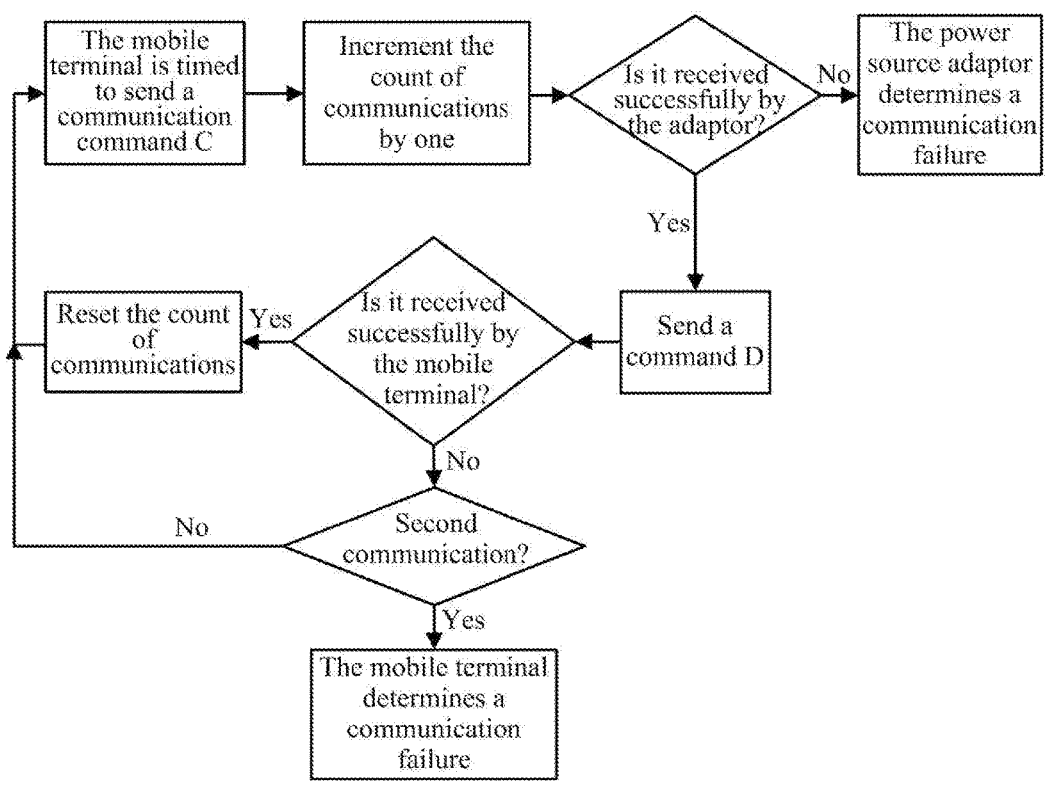
FIG. 5 is a flow chart of an embodiment of a timed detection mechanism of communication between the mobile terminal and the DC-charging power source adaptor illustrated in FIG. 1.

If the microprocessor determines that the inserted external device is the DC-charging power source adaptor, in order to enable a better switching mechanism and error-tolerant mechanism, in this embodiment, communication between the mobile terminal and the DC-charging power source adaptor can be detected in the following flow as illustrated in FIG. 4: the microprocessor initiates a communication command A on its own initiative to the external power source adaptor after switching the communication interface of the microprocessor from the differential data interfaces DP and DN to the UART interfaces TXD and RXD, and also counts the number of communications. The DC-charging power source adaptor receiving successfully the communication command A can respond accordingly by sending a communication command B to the mobile terminal, and if the mobile terminal does not receive any valid communication command B, then the microprocessor firstly determines the count of communications at that time, and if the count of communications is less than 2, then the microprocessor retransmits the communication command A for a second attempt on communication; and if the count of communications is more than or equal to 2, then the microprocessor determines that the communication fails, and disconnects the differential data pins D+ and D− of the USB interface Ji of the mobile terminal from the UART interfaces TXD and RXD of the microprocessor to return the original state where the differential data pins D+ and D− of the USB interface Ji are connected with the differential data pins DP and DN of the microprocessor. If the mobile terminal receives successfully the communication command B, then the microprocessor determines that the communication succeeds, and resets the count of communications, and thereafter can start a timed communication detecting mechanism as illustrated in FIG. 5.

In the timed communication detecting mechanism, the mobile terminal is timed to send a handshake instruction, e.g., a communication instruction C, to the DC-charging power source adaptor, and also increments the count of communications by one; and if the DC-charging power source adaptor receives successfully the communication instruction C, then it feeds back immediately a response instruction to the mobile terminal, for example, it sends a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal retransmits the communication instruction C to the DC-charging power source adaptor, and if both of the communications fail, then the mobile terminal determines that the DC-charging power source adaptor plugged in becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

S303. The mobile terminal enters a corresponding charging mode according to the detected type of the external device.

In this embodiment, if the inserted external device is detected as the host or the normal power source adaptor, then the battery is charged by the power source managing chip in the standard SDP charging mode (if the host is inserted) or the standard DCP charging mode (if the normal power source adaptor is inserted).

The microprocessor controls the DC-charging switch to be kept in the default Off state, and also starts the power source managing chip to receive the charging voltage input by the host or the normal power source adaptor, and to enter different charging phases according to current core voltage of the battery. By way of an example, for a 4.2V chargeable battery (4.2V is core voltage of the battery being fully charged), if the core voltage is less than 3.5V, then the power source managing chip enters a small-current pre-charging phase in which 500 mA charging current is output, and the battery is pre-charged at the small current. If the core voltage of the battery lies between 3.5V and 4.1V, then the power source managing chip enters a constant-current charging phase in which 1 A or 1.5 A charging current is output, and the battery is charged at the constant current. The battery is charged in the constant-current charging phase in the majority of the entire charging process, and typically it takes approximately 90% of the entire charging period of time for the core voltage of the battery to rise from 3.5V to 4.1V. If the core voltage of the battery rises above 4.1V, then the power source managing chip enters a constant-voltage charging phase in which constant voltage is output to charge the battery, and at this time the charging current is gradually decreased with the rising voltage of the battery until the battery is fully charged.

If the inserted external device is detected as the DC-charging power source adaptor, then the mobile terminal operates in a subsequent rapid charging mode.

S304. The mobile terminal judges whether the core voltage of the battery lies in a range delimited by DC-charging thresholds, and if so, then the mobile terminal performs a subsequent large-current DC-charging process; otherwise, the battery is charged by the power source managing chip.

In this embodiment, the DC-charging thresholds (a lower voltage threshold S1 and a higher voltage threshold S2) can be determined dependent upon the real condition of the battery, and the range delimited by the DC-charging thresholds can be the same as the voltage range of the battery corresponding to the constant-current charging phase in the standard DCP charging mode. For example, the lower voltage threshold S1 and the higher voltage threshold S2 of the 4.2V chargeable battery above can be set to S1=3.5V and S2=4.1V respectively. If the core voltage Vbat_real of the battery is Vbat_real<3.5V or Vbat_real>4.1V, then the microprocessor controls the DC-charging switch to be kept in the default Off state, and also starts the power source managing chip to receive the constant charging voltage input by the DC-charging power source adaptor, e.g., DC 5V charging voltage, to pre-charge the battery at small current (for Vbat_real<3.5V) or at constant voltage (for Vbat_real>4.1V), that is, the battery is charged in the same charging mode as the host and the normal power source adaptor. If the core voltage Vbat_real of the battery is detected in the range [3.5V, 4.1V] delimited by the DC-charging thresholds, then the mobile terminal enters the subsequent DC-charging process.

S305. The mobile terminal communicates with the DC-charging power source adaptor via the UART interfaces thereof, adjusts dynamically the charging voltage output by the DC-charging power source adaptor according to the varying core voltage of the battery, and controls the DC-charging switch to be closed to have the power source managing chip shorted so that the power source managing chip stops operating, and the charging voltage is transmitted directly to the battery to DC-charge the battery.

In this embodiment, the charging voltage can be adjusted dynamically in any one of the following three alternative designed approaches:

In a first designed approach, a relationship reference table between the core voltage of the battery and the target charging voltage is preset in the mobile terminal, the core voltage of the battery is detected, and the reference table is searched using the core voltage for the target charging voltage corresponding to the core voltage to control the voltage output of the DC-charging power source adaptor.

The core voltage of the battery can be divided into several intervals according to the range [S1, S2] delimited by the DC-charging thresholds, for example, the core voltage is divided into N intervals at a span of 100 mV, where N=(S2−S1)/100 mV. For each interval, a target charging voltage value Vout, a target charging current value Itarg, and a charging current maximum value Imax corresponding to the core voltage in the interval are predetermined, and the reference table is created and stored in the microprocessor, or in a memory in the mobile terminal, connected with the microprocessor for invoking by the microprocessor.

Figure 6:
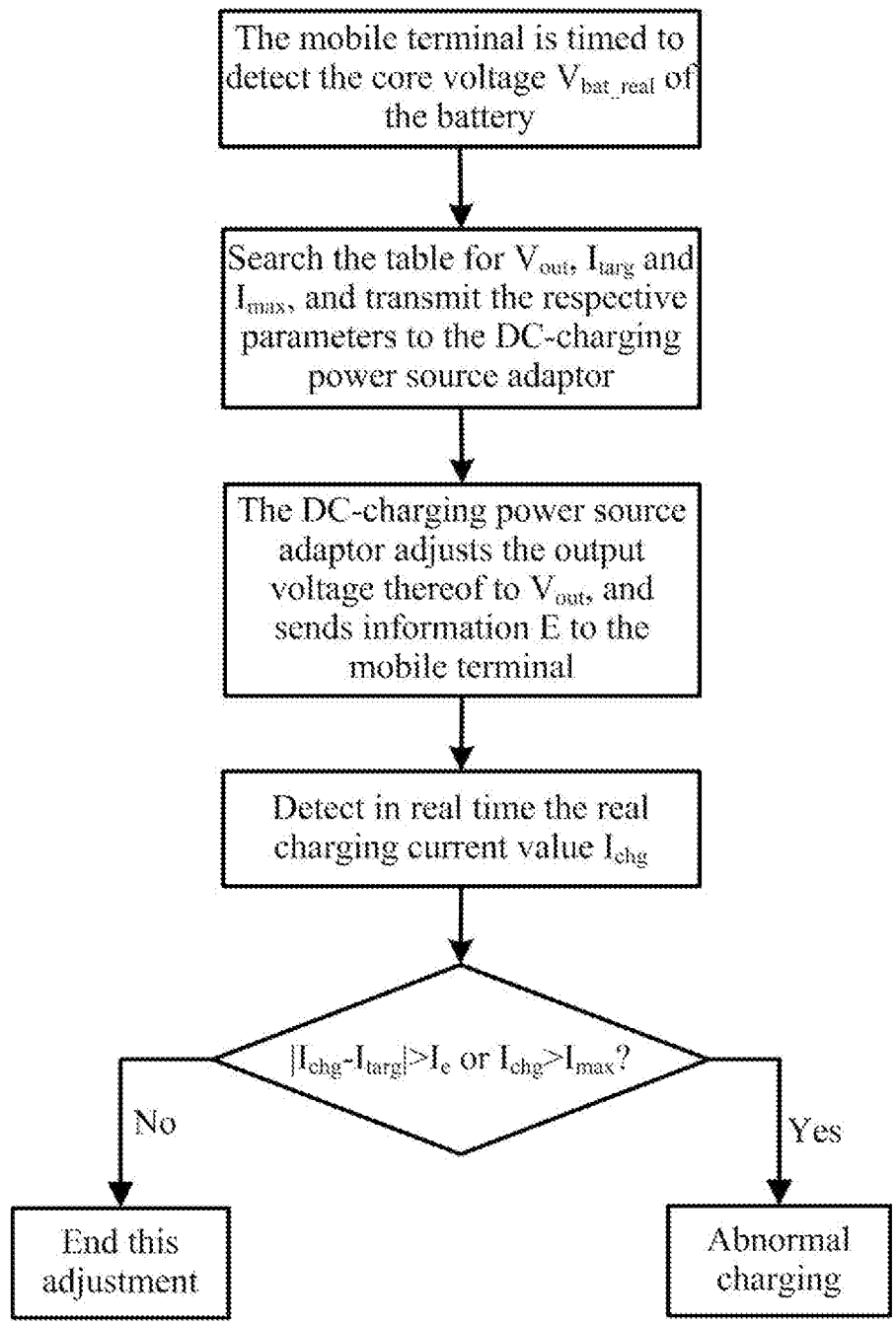
FIG. 6 is a flow chart of control in an embodiment of a DC-charging control strategy using a lookup table.

After entering the DC-charging process, as illustrated in FIG. 6, the microprocessor is timed to detect the core voltage Vbat_real of the battery, searches the reference table using the detected core voltage Vbat_real, determines the core voltage interval in which the core voltage Vbat_real lies, and then searches using the determined interval for the target charging voltage value Vout, the target charging current value Itarg, and the charging current maximum value Imax corresponding to the interval. Thereafter the microprocessor conducts UART communication with the DC-charging power source adaptor, and sends the target charging voltage value Vout, the target charging current value Itarg, and the charging current maximum value Imax to the DC-charging power source adaptor.

At the DC-charging power source adaptor side, the DC-charging power source adaptor adjusts the resistance value of the valid resistor of the digital potentiometer thereof according to the received target charging voltage value Vout to thereby change the charging voltage output by the AC-DC unit thereof to the target charging voltage value Vout. At the end of the adjusting, the DC-charging power source adaptor sends information E to the mobile terminal, detects in real time the real charging current Ichg output by the AC-DC unit, through the current detecting chip, and if |Ichg−Itarg|>Ie (Ie represents a controllable range of the difference between the real charging current value of the DC-charging power source adaptor and the target charging current value, and can be set to Ie=500 mA in this embodiment), or Ichg>Imax, then the DC-charging power source adaptor determines abnormal charging. At this time in order to ensure the safety in charging, the DC-charging power source adaptor outputs the invalid enable signal through the controller therein, as illustrated in FIG. 2, to control the boosting circuit to stop outputting the switch voltage, and to further control the pair of MNOS transistors Q1 to be switched off to thereby block the charging power source output by the AC-DC unit from being transmitted to the mobile terminal. If |Ichg−Itarg|≤Ie and Ichg≤Imax, then the DC-charging power source adaptor ends this adjusting process, and DC-charges at large current the battery in the mobile terminal using the adjusted charging voltage, where the charging current here can rise beyond 3500 mA, to thereby significantly speed up charging.

The following implementation to create the reference table is proposed in this embodiment:

A number i of intervals, denoted as xi1~xi2, are set for the core voltage in the range of [S1, S2];

For each of the intervals $[x_{i1}, x_{i2}]$, a target charging voltage value $V_{out}$, a target charging current value $I_{targ}$, and a charging current maximum value $I_{max}$ corresponding to the interval are calculated respectively in the equations of:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat}, I_{allow}) \quad (3)$$

Where $R_{line}$ represents a resistance value on the charging line; $R_{board}$ represents a resistance value on a circuit board of the mobile terminal; $R_{bat}$ represents an inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which lies in the range of [150 mA, 250 mA]; and The reference table is created according to the parameters Vbat_real, Vout, Itarg and Imax.

In this embodiment, in order not to measure Rline and Rboard, the sum of the resistance value Rline on the charging line, and the resistance value Rboard on the circuit board of the mobile terminal can be calculated in the equation of:

$$R_{line}+R_{board}=(V_{out}-V_{bat})I_{chg} \quad (4)$$

Where $V_{bat}$ represents the terminal voltage of the battery. That is, the terminal voltages $V_{bat}$ of the battery, and the charging currents $I_{chg}$, for different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In a alternative designed implementation of this embodiment, the target charging voltage value $V_{out}$ and the charging current maximum value $I_{max}$ corresponding to each interval $[x_{i1}, x_{i2}]$ can be calculated as follows: a lower bound value xi1 of the core voltage in the interval is used as Vbat_real and substituted into Equation (1) to calculate the target charging voltage value Vout corresponding to the interval; a higher bound value xi2 of the core voltage in the interval is used as Vbat_real and substituted into Equation (3) to calculate the charging current maximum value Imax corresponding to the interval; and further the target charging current value Itarg is derived from calculated Imax in Equation (2), and the reference table is created.

By way of an example, still taking the 4.2V chargeable battery as an example, for the system powered by the battery, from the perspective of the safety of providing voltage to the device, the terminal voltage Vbat of the battery shall not be more than a fixed value Vbat_max, where the fixed value Vbat_max is dependent upon the platform and less than the specified safe value Vbat_safe of the terminal voltage of the battery. If the safe value Vbat_safe of the terminal voltage of the battery is Vbat_safe=4500 mV, then Vbat_max=4470 mV can be taken, so the terminal voltage Vbat of the battery is Vbat=Vbat_real+Ichg*Rbat≤4470.

From the perspective of the safety of the battery, if the maximum safe charging current value is taken as Ialow=4000 mA, then the charging current maximum value $I_{max}$ is calculated as follows in Equation (3):

$$I_{max} = \min((4470 - V_{bat\_real})/R_{bat}, 4000) \quad (5)$$

If the inner resistance $R_{bat}$ of the battery is $R_{bat}$=100 mΩ, the other impedance is $R_{line}+R_{board}$=100 mΩ, and the range delimited by the DC-charging thresholds of the battery is [3500 mV, 4100 mV] at a span of 100 mV, then the range [3500 mV, 4100 mV] delimited by the DC-charging thresholds can be divided into 6 intervals; a higher bound value of the core voltage in each interval is substituted into Equation (5) to calculate the charging current maximum value Imax; the target charging current value Itarg is derived from calculated Imax in Equation (2), and ΔI=200 mA is taken in this embodiment; and a lower bound value of the core voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the core voltage of the battery, and the charging current and the charging voltage output by the adaptor, but there may be a minor error relative to the real correspondence relationship, so the battery can be experimentally charged to record the charging voltage varying with the varying charging current, and to adjust the values of the parameters in the reference table, for example, the values of the respective parameters in the reference table are adjusted to their ideal values by averaging them.

The target charging voltage obtained by looking up from the table is a theoretical value, however in reality, the inner resistance of the battery, and the impedance on the line may vary with temperature, aging, and other factors, so the real charging current value $I_{chg}$ output by the DC-charging power source adaptor may deviate to some extent from the target charging current value $I_{targ}$, thus resulting in some influence upon the charging speed. In order to boost the charging current as much as possible in an allowable range to further speed up charging, in this embodiment, a charging current self-adjusting algorithm is introduced at the DC-charging power source adaptor side, that is, after the DC-charging power source adaptor adjusts the output voltage to $V_{out}$, if $I_{targ}-I_e \leq I_{chg} < I_{targ}$, then $V_{out}=V_{out}+\Delta V$ is adjusted progressively so that the real charging current value $I_{chg}$ output by the DC-charging power source adaptor approaches progressively the target charging current value $I_{targ}$.

In this embodiment, Vout can be adjusted for five times by an amount which can be estimated in Equation (1), and if Vbat_real and R (including the inner resistance of the battery, the line resistance, and all the other impedances) are invariable, then ΔV=ΔI*R. In this embodiment, ΔV can be set to ΔV=10 mV.

In a second designed approach, a relationship reference table between the core voltage of the battery and the target charging voltage is preset at the DC-charging power source adaptor side, and the DC-charging power source adaptor searches the reference table using the received core voltage (detected and provided by the mobile terminal) for the target charging voltage value corresponding to the core voltage. Thereafter the DC-charging power source adaptor adjusts the output voltage thereof to the target charging voltage value to DC-charge the battery built in the mobile terminal at large current.

Reference can be made for the related description in the first designed approach above for creation of the reference table.

Noted that after entering the DC-charging process, at the mobile terminal side, the microprocessor is timed to detect the core voltage Vbat_real of the battery, conducts UART communication with the DC-charging power source adaptor, and is timed to send the detected core voltage Vbat_real to the DC-charging power source adaptor.

At the DC-charging power source adaptor side, the DC-charging power source adaptor searches the stored reference table thereof using the received core voltage Vbat_real, determines the core voltage interval in which the core voltage Vbat_real lies, and then searches using the determined interval for the target charging voltage value Vout, the target charging current value Itarg, and the charging current maximum value Imax corresponding to the interval. Then the controller adjusts the resistance value of the valid resistor of the digital potentiometer to thereby change the charging voltage output by the AC-DC unit thereof to the target charging voltage value Vout. At the end of the adjusting, the DC-charging power source adaptor sends information E to the mobile terminal, and sends Itarg and Imax to the mobile terminal for detection of abnormal charging. At the same time the DC-charging power source adaptor detects in real time the real charging current value Ichg output by the AC-DC unit, through the current detecting chip thereof, and if |Ichg−Itarg|>Ie or Ichg>Imax, then the DC-charging power source adaptor determines abnormal charging, disconnects the charging power source from being output, and stops charging the mobile terminal. If |Ichg−Itarg|≤Ie and Ichg≤Imax, then the DC-charging power source adaptor ends this adjusting process.

Also the charging current self-adjusting algorithm described in the first designed approach above can be introduced at the DC-charging power source adaptor side so that the real charging current value Ichg output by the DC-charging power source adaptor can approach progressively the target charging current value Itarg to thereby further speed up charging.

The table-lookup approach above relating to segmented constant-current-like charging can reduce the count of times that the output voltage of the DC-charging power source adaptor is adjusted, but the output voltage is constant for a period of time, and the charging current is decreasing gradually with the ever rising core voltage of the battery, thus resulting in some influence upon the charging speed of the battery.

In order to enable the charging current to be maintained at a stable high level, DC-charging control by following in real time the varying core voltage is proposed in this embodiment as described in the following third designed approach.

In the third designed approach, the target charging voltage value is adjusted in real time by following dynamically the varying core voltage of the battery.

Figure 7:
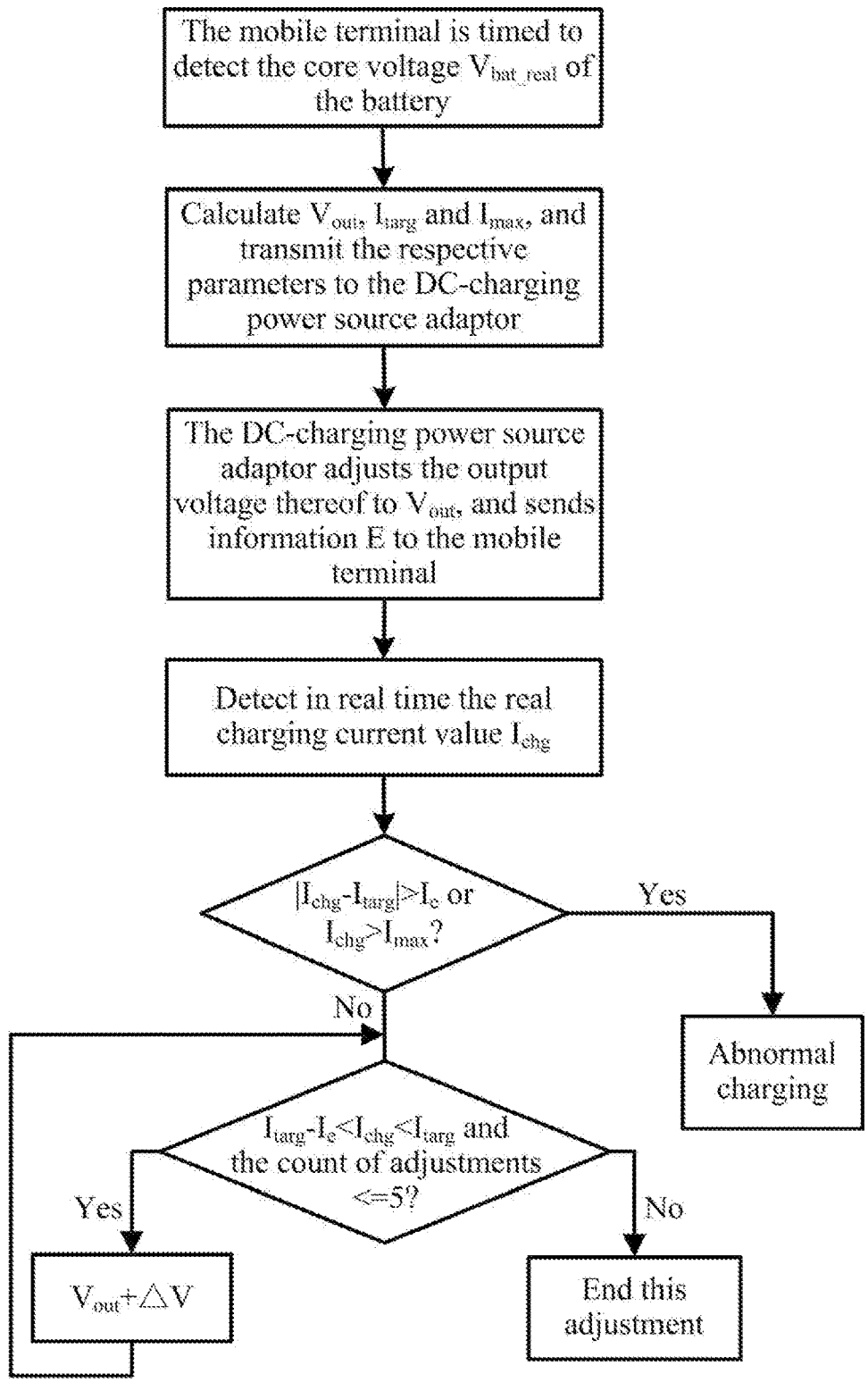
FIG. 7 is a flow chart of control in an embodiment of a voltage-following DC-charging control strategy.

As illustrated in FIG. 7, after entering the DC-charging process, the microprocessor in the mobile terminal is timed to detect the core voltage Vbat_real of the battery, calculates the target charging voltage value Vout, the target charging current value Itarg, and the charging current maximum value Imax using Equations (1) to (4), and sends these values to the DC-charging power source adaptor.

The DC-charging power source adaptor adjusts the resistance value of the valid resistor of the digital potentiometer thereof according to the received target charging voltage value Vout to thereby adjust the charging voltage output by the AC-DC unit thereof to the target charging voltage value Vout. At the end of the adjusting, the DC-charging power source adaptor sends information E to the mobile terminal, and also detects the charging current Ichg output by the DC-charging power source adaptor, through the current detecting chip, and if |Ichg−Itarg|>Ie or Ichg>Imax, then the DC-charging power source adaptor determines abnormal charging, disconnects the charging power source from being output by the DC-charging power source adaptor to the outside, and notifies the mobile terminal of abnormal charging. If |Ichg−Itarg|≤Ie and Ichg≤Imax, then the DC-charging power source adaptor ends this adjusting process, or starts the charging current self-adjusting algorithm above to finely adjust the charging voltage for at most five times (or another number of times), so that the real charging current value Ichg output by the DC-charging power source adaptor approaches progressively the target charging current value Itarg to thereby speed up charging as much as possible.

S306. The mobile terminal detects whether the core voltage of the battery exceeds the range delimited by the DC-charging thresholds, and if not, then the flow returns to the operation S305; otherwise, the flow proceeds to a subsequent operation.

S307. The microprocessor controls the DC-charging switch to be opened to disconnect the DC-charging pathway, and instructs the DC-charging power source adaptor to adjust the output voltage thereof to the default constant charging voltage, e.g., 5V DC-charging voltage, and to start the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the Mobile Terminal Side (1) The mobile terminal detecting that it is being powered by the DC-charging power source adaptor is timed to send a handshake instruction to the DC-charging power source adaptor, and waits for a preset period of time until the DC-charging power source adaptor feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the DC-charging process, if the mobile terminal detects that the DC-charging power source adaptor is pulled out suddenly, then it disconnects the DC-charging pathway between the charging interface of the mobile terminal and the battery, and has the charging interface connected with the power source managing chip;

(3) After entering the DC-charging process, if the mobile terminal detects that the terminal voltage of the battery exceeds the preset threshold (the threshold of the terminal voltage of the 4.2V chargeable battery can be preset to 4.6V), then it disconnects the DC-charging pathway between the charging interface of the mobile terminal and the battery, and instructs the DC-charging power source adaptor to be switched to the default constant charging voltage for output, e.g., 5V DC voltage;

(4) After entering the DC-charging process, the mobile terminal detects in real time the received real charging current value Ichg, and if the absolute value of the difference between Ichg and Itarg goes beyond the preset controllable range of the difference, then it disconnects the DC-charging pathway between the charging interface of the mobile terminal and the battery, and switches to the power source managing chip to charge the battery; and (5) After entering the DC-charging process, the mobile terminal detects in real time the received real charging current value Ichg, and if Ichg is more than Imax, then it disconnects the DC-charging pathway between the charging interface of the mobile terminal and the battery, and notifies the user of the power source adaptor being abnormal 2. At the DC-Charging Power Source Adaptor Side (1) The DC-charging power source adaptor obtaining the target charging voltage value Vout, the target charging current value Itarg, and the charging current maximum value Imax detects in real time its output real charging current value Ichg, and if the absolute value of the difference between Ichg and Itarg goes beyond the preset controllable range of the difference, then the DC-charging power source adaptor stops outputting the charging power source, and flicks a lamp to alert the user;

(2) After entering the DC-charging process, the DC-charging power source adaptor detects in real time its output real charging current value Ichg, and if Ichg is more than Imax, then it determines abnormal charging, and stops the charging power source from being output to avoid the mobile terminal from being damaged due to being further powered.

Of course, the mobile terminal and the DC-charging power source adaptor can alternatively exchange data wirelessly with each other as illustrated in FIG. 2, for example, firstly handshake communication between the mobile terminal and the DC-charging power source adaptor can be conducted in the UART communication mode, so that the mobile terminal can identify accurately the DC-charging power source adaptor. Then in order to further improve the accuracy of the respective parameters being transmitted in charging, the data can be exchanged wirelessly instead to thereby improve the stability of communication. A wireless communication module, e.g., Bluetooth, WiFi, or another wireless communication module can be arranged in the controlling unit of the DC-charging power source adaptor to be connected with the controller, such as another branch of UART interfaces TX1 and RX1 of the controller; and a matched wireless communication module, e.g., a Bluetooth chip, can be arranged in the mobile terminal to be connected with the microprocessor. If the mobile terminal needs to exchange data with the DC-charging power source adaptor, then communication data generated by the microprocessor and the controller can be sent to the wireless communication modules connected therewith for conversion into a wireless signal sent to their counterparts. Due to the wireless communication, such a difference in ground level between the power source adaptor and the mobile terminal can be addressed that arises due to a significant voltage drop across a charging line between the power source adaptor and the mobile terminal being charged at large current, where the difference in ground level would otherwise have an influence on a quality of waveform of the communication signal, thus resulting in the instability of communication.

The charging method according to this disclosure can be widely applied to a handset, a tablet computer, a notebook computer, a mobile power source, and other mobile terminals so as to satisfy different charging demands of the user.

Figure 8:
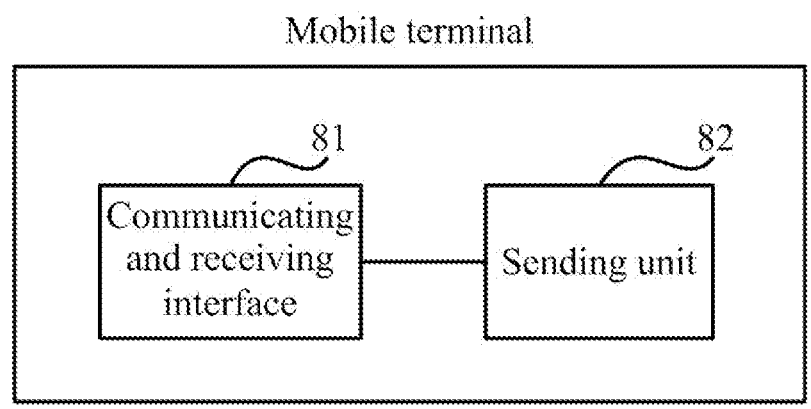
FIG. 8 is a schematic diagram of a mobile terminal according to this disclosure.

As illustrated in FIG. 8, a mobile terminal according to an embodiment of this disclosure includes:

A communicating and receiving interface 81 is configured to communicate with a DC-charging power source adaptor to send a change in voltage of a battery in the mobile terminal to the DC-charging power source adaptor so that the DC-charging power source adaptor adjusts dynamically a volt value of charging voltage output by the DC-charging power source adaptor according to the change in voltage, and to receive the charging voltage input by the DC-charging power source adaptor; and A sending unit 82 is configured to send a specific pulse waveform to the DC-charging power source adaptor after the mobile terminal is connected with the DC-charging power source adaptor.

Advantages and beneficial effects of this disclosure lie in that this disclosure proposes a DC-charging power source adaptor outputting dynamically adjustable voltage instead of the traditional scheme in which the normal power source adaptor outputs constant voltage. The communication function is configured in the DC-charging power source adaptor to be timed to communicate with the mobile terminal which is a charging object, to obtain the change in voltage of the battery in the mobile terminal and further adjust dynamically the volt value of the charging voltage output by the power source adaptor according to the change in voltage of the battery, so that the battery in the mobile terminal can be charged at higher voltage to thereby significantly raise the charging current. The battery in the mobile terminal can be DC-charged at large current using the charging voltage to thereby speed up charging of the battery so as to shorten the period of time required for charging the mobile terminal, to alleviate such an influence upon the user in a daily access to the mobile terminal that arises from the mobile terminal being frequently charged for a long period of time, and to greatly improve the satisfactory of the user with the mobile terminal.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A DC-charging power source adaptor comprising:
a charging interface configured to be connected with a mobile terminal having a battery, the charging interface comprising a power source pin, a ground pin, and two communication pins shorted by default;
an AC to DC converting unit configured to convert an external AC input power source into a charging voltage required by the mobile terminal, and output the charging voltage via the charging interface; and
a controlling unit in connection with the charging interface, and configured to disconnect the two communication pins of the charging interfaces from each other upon detecting that the charging interface is connected with the mobile terminal, and communicate with the mobile terminal through the two communication pins to adjust the charging voltage output by the AC to DC converting unit, and wherein the controlling unit is further configured to:
receive a target charging voltage value sent by the mobile terminal and adjust the charging voltage output by the AC to DC converting unit according to the target charging voltage value to reach the target charging voltage value; or
receive a voltage of the battery sent by the mobile terminal, if the voltage of the battery is in a range delimited by preset DC-charging thresholds, search a preset reference table using the voltage of the battery as a target charging voltage value corresponding to the current voltage of the battery, feedback the target charging voltage value to the mobile terminal, and adjust the charging voltage output by the AC to DC converting unit to the target charging voltage value, and if the voltage of the battery is out of the range delimited by the preset DC-charging thresholds, control the AC to DC converting unit to output constant charging voltage.

2. The DC-charging power source adaptor according to claim 1, wherein the controlling unit includes UART interfaces configured to receive an input and connect with the two communication pins, and wherein after the UART interfaces receive a specific pulse waveform sent by the mobile terminal, the controlling unit is configured to disconnect the two communication pins of the charging interface from each other, configure the UART interfaces to function as a communication interface, and conduct UART communication information with the mobile terminal.

3. The DC-charging power source adaptor according to claim 1, wherein the controlling unit is configured to:
disconnect the two communication pins from each other after a connection between the charging interface and the mobile terminal is detected and a preset period of time is delayed; and
send a UART communication command on its own initiative to the mobile terminal to exchange a handshake instruction therewith or wait for reception of a UART communication command sent by the mobile terminal, and feedback a response command to complete a handshake upon reception of the UART communication command; and
wherein the preset period of time is determined as a function of a period of time when the mobile terminal detects an external device being inserted to when the mobile terminal detects differential data pins of the mobile terminal are shorted.

4. The DC-charging power source adaptor according to claim 1, wherein:
when the voltage of the battery is in the range delimited by the preset DC-charging thresholds, the controlling unit is configured to receive a target charging current value $I_{targ}$ and a charging current maximum value $I_{max}$ sent by the mobile terminal, or search the reference table for a target charging current value $I_{targ}$ and a charging current maximum value $I_{max}$ corresponding to the current voltage of the battery;

the controlling unit is further configured to detect a charging current $I_{chg}$ output via the charging interface, and if $I_{targ}-I_e \le I_{chg} < I_{targ}$, control the AC to DC converting unit to progressively increase the charging voltage output by the AC to DC converting unit by an amount of $\Delta V$, so that the charging current $I_{chg}$ output via the charging interface approaches the target charging current value $I_{targ}$, or if the absolute value of the difference between the charging current $I_{chg}$ and the target charging current value $I_{targ}$ is more than $I_e$ or the charging current $I_{chg}$ is more than the charging current maximum value $I_{max}$, stop the charging voltage from being output to the charging interface; and $I_e$ represents a controllable range of the difference between a value of the charging current $I_{chg}$ and the target charging current value $I_{targ}$.

5. The DC-charging power source adaptor according to claim 1, further comprising two signal lines connected with the two communication pins and a switch connected across the two signal lines, wherein the control unit is configured to control the switch to close or open to short or disconnect the two communication pins.

6. The DC-charging power source adaptor according to claim 1, wherein the AC to DC converting unit includes a rectifying circuit, a transformer, a synchronous rectification controller, and a PWM controller, wherein the controlling unit includes a controller and a digital potentiometer, wherein the rectifying circuit is configured to rectify an AC input power source into a DC power source, and output the DC power source to the transformer for transformation into the charging voltage, wherein the controller of the controlling unit is configured to conduct UART communication with the mobile terminal through UART interfaces of the controller, generate a voltage adjusting instruction according to the charging voltage required by the mobile terminal and send the voltage adjusting instruction to the digital potentiometer to change a resistance value of a valid resistor of the digital potentiometer, wherein the digital potentiometer includes a resistor body connected in series with a current-limiting resistor and between an anode of a secondary coil of the transformer and ground, wherein the resistor body includes an intermediate tap connected with a reference voltage pin of the synchronous rectification controller, and wherein the synchronous rectification controller is configured to adjust a duty ratio of a PWM signal output by the PWM controller according to the varying resistance value of the valid resistor of the digital potentiometer, and control a switching timing of the transformer using the PWM signal to adjust a volt value of the charging voltage output by the transformer.

7. The DC-charging power source adaptor according to claim 2, wherein the AC to DC converting unit includes a rectifying circuit, a transformer, a synchronous rectification controller, and a PWM controller, wherein the controlling unit includes a controller and a digital potentiometer, wherein the rectifying circuit is configured to rectify an AC input power source into a DC power source, and output the DC power source to the transformer unit for transformation into the charging voltage, wherein the controller of the controlling unit is configured to conduct UART communication with the mobile terminal through the UART interfaces of the controller, generate a voltage adjusting instruction according to the charging voltage required by the mobile terminal and send the voltage adjusting instruction to the digital potentiometer to change a resistance value of a valid resistor of the digital potentiometer, wherein the digital potentiometer includes a resistor body connected in series with a current-limiting resistor and between an anode of a secondary coil of the transformer and ground, wherein the resistor body includes an intermediate tap connected with a reference voltage pin of the synchronous rectification controller, and wherein the synchronous rectification controller is configured to adjust a duty ratio of a PWM signal output by the PWM controller according to the varying resistance value of the valid resistor of the digital potentiometer, and control a switching timing of the transformer using the PWM signal to adjust a volt value of the charging voltage output by the transformer.

8. The DC-charging power source adaptor according to claim 3, wherein the AC to DC converting unit includes a rectifying circuit, a transformer, a synchronous rectification controller, and a PWM controller, wherein the controlling unit includes a controller and a digital potentiometer, wherein the rectifying circuit is configured to rectify an AC input power source into a DC power source, and output the DC power source to the transformer for transformation into the charging voltage, wherein the controller of the controlling unit is configured to conduct UART communication with the mobile terminal through UART interfaces of the controller, generate a voltage adjusting instruction according to the charging voltage required by the mobile terminal and send the voltage adjusting instruction to the digital potentiometer to change a resistance value of a valid resistor of the digital potentiometer, wherein the digital potentiometer includes a resistor body connected in series with a current-limiting resistor and between an anode of a secondary coil of the transformer and ground, wherein the resistor body includes an intermediate tap connected with a reference voltage pin of the synchronous rectification controller, and wherein the synchronous rectification controller is configured to adjust a duty ratio of a PWM signal output by the PWM controller according to the varying resistance value of the valid resistor of the digital potentiometer, and control a switching timing of the transformer using the PWM signal to adjust a volt value of the charging voltage output by the transformer.

9. The DC-charging power source adaptor according to claim 4, wherein the AC to DC converting unit includes a rectifying circuit, a transformer, a synchronous rectification controller, and a PWM controller, wherein the controlling unit includes a controller and a digital potentiometer, wherein the rectifying circuit is configured to rectify an AC input power source into a DC power source, and output the DC power source to the transformer for transformation into the charging voltage, wherein the controller of the controlling unit is configured to conduct UART communication with the mobile terminal through UART interfaces of the controller, generate a voltage adjusting instruction according to the charging voltage required by the mobile terminal and send the voltage adjusting instruction to the digital potentiometer to change a resistance value of a valid resistor of the digital potentiometer, wherein the digital potentiometer includes a resistor body connected in series with a current-limiting resistor and between an anode of a secondary coil of the transformer and ground, wherein the resistor body includes an intermediate tap connected with a reference voltage pin of the synchronous rectification controller, and wherein the synchronous rectification controller is configured to adjust a duty ratio of a PWM signal output by the PWM controller according to the varying resistance value of the valid resistor of the digital potentiometer, and control a switching timing of the transformer using the PWM signal to adjust a volt value of the charging voltage output by the transformer.

10. The DC-charging power source adaptor according to claim 5, wherein the AC to DC converting unit includes a rectifying circuit, a transformer, a synchronous rectification controller, and a PWM controller, wherein the controlling unit includes a controller and a digital potentiometer, wherein the rectifying circuit is configured to rectify an AC input power source into a DC power source, and output the DC power source to the transformer for transformation into the charging voltage, wherein the controller of the controlling unit is configured to conduct UART communication with the mobile terminal through UART interfaces of the controller, generate a voltage adjusting instruction according to the charging voltage required by the mobile terminal and send the voltage adjusting instruction to the digital potentiometer to change a resistance value of a valid resistor of the digital potentiometer, wherein the digital potentiometer includes a resistor body connected in series with a current-limiting resistor and between an anode of a secondary coil of the transformer and ground, wherein the resistor body includes an intermediate tap connected with a reference voltage pin of the synchronous rectification controller, and wherein the synchronous rectification controller is configured to adjust a duty ratio of a PWM signal output by the PWM controller according to the varying resistance value of the valid resistor of the digital potentiometer, and control a switching timing of the transformer using the PWM signal to adjust a volt value of the charging voltage output by the transformer.

11. The DC-charging power source adaptor according to claim 6, wherein the AC to DC converting unit further comprises:
an optical coupler connected between the synchronous rectification controller and the PWM controller, and configured to optic-electrically isolate a signal output by the synchronous rectification controller; and
a power MOS transistor connected between a cathode of the secondary coil of the transformer and the ground pin of the charging interface, wherein the synchronous rectification controller is configured to control the power MOS transistor to switch on or off to rectify the charging voltage output by the transformer.

12. The DC-charging power source adaptor according to claim 6, wherein the controlling unit further comprises:
a switch transistor configured to support a large current to pass, wherein a switch path of the switch transistor is connected in a transmission line of the charging voltage; and
a boosting circuit connected with the controller, and configured to, upon reception of a valid enable signal output by the controller, output a higher switch voltage than the volt value of the charging voltage to a control pole of the switch transistor to control the switch transistor to connect the transmission line of the charging voltage.

13. The DC-charging power source adaptor according to claim 12, wherein:
the controlling unit further comprises a current sampling resistor connected in series in the transmission line of the charging voltage, a current detecting chip connected with two ends of the current sampling resistor, and configured to detect a voltage difference across the current sampling resistor, and amplify the voltage difference to output sample voltage, and a voltage dividing circuit configured to divide the sample voltage to adjust the sample voltage within an interface voltage range acceptable to the controller, and transmit the sample voltage to an ADC interface of the controller to detect a current value output via the charging interface; and
the controller is configured to detect that the current value output via the charging interface is beyond an acceptable current range, send an invalid enable signal to the boosting circuit to stop the switch voltage from being output, and control the switch transistor to disconnect the transmission line of the charging voltage to stop the mobile terminal from being charged.

14. A mobile terminal comprising:
a communicating and receiving interface configured to communicate with a DC-charging power source adaptor to send a change in voltage of a battery in the mobile terminal to the DC-charging power source adaptor so that the DC-charging power source adaptor dynamically adjusts a volt value of a charging voltage output by the DC-charging power source adaptor according to the change in voltage, and receive the charging voltage provided by the DC-charging power source adaptor; and
a sending unit configured to send a specific pulse waveform to the DC-charging power source adaptor after the mobile terminal is connected with the DC-charging power source adaptor, and wherein the sending unit is further configured to:
send a target charging voltage value to the DC-charging power source adaptor so that the DC-charging power source adaptor adjusts the charging voltage provided by the DC-charging power source adaptor according to the target charging voltage value to reach the target charging voltage value; or
send a voltage of the battery to the DC-charging power source adaptor so that if the voltage of the battery is in a range delimited by preset DC-charging thresholds, the DC-charging power source adaptor searches a preset reference table using the voltage of the battery as a target charging voltage value corresponding to the current voltage of the battery, and adjusts the charging voltage provided by the DC-charging power source adaptor to the target charging voltage value; and
wherein the communicating and receiving interface is configured to receive the target charging voltage value determined based on the preset reference table if the voltage of the battery is in a range delimited by preset DC-charging thresholds, and receive a constant charging voltage provided by the DC-charging power source adaptor if the voltage of the battery is out of the range delimited by the preset DC-charging thresholds.

15. A DC-charging power source adaptor comprising:
a charging interface configured to be connected with a mobile terminal having a battery, the charging interface comprising a power source pin, a ground pin, and two communication pins shorted by default;
an AC to DC converting unit configured to convert an external AC input power source into a charging voltage required by the mobile terminal, and output the charging voltage via the charging interface, the AC to DC converting unit including a rectifying circuit, a transformer, a synchronous rectification controller, and a PWM controller, the rectifying circuit configured to rectify an AC input power source into a DC power source and output the DC power source to the transformer for transformation into the charging voltage; and a controlling unit in connection with the charging interface, and configured to disconnect the two communication pins of the charging interfaces from each other upon detecting that the charging interface is connected with the mobile terminal, and communicate with the mobile terminal through the two communication pins to adjust the charging voltage output by the AC to DC converting unit, the controlling unit including a controller and a digital potentiometer, the digital potentiometer including a resistor body connected in series with a current-limiting resistor and between an anode of a secondary coil of the transformer and ground, the resistor body including an intermediate tap connected with a reference voltage pin of the synchronous rectification controller, the controller configured to conduct UART communication with the mobile terminal through UART interfaces of the controller, generate a voltage adjusting instruction according to the charging voltage required by the mobile terminal and send the voltage adjusting instruction to the digital potentiometer to change a resistance value of a valid resistor of the digital potentiometer, wherein the synchronous rectification controller is configured to adjust a duty ratio of a PWM signal output by the PWM controller according to the varying resistance value of the valid resistor of the digital potentiometer, and control a switching timing of the transformer using the PWM signal to adjust a volt value of the charging voltage output by the transformer.

16. The DC-charging power source adaptor according to claim 15, wherein the controlling unit includes UART interfaces configured to receive an input and connect with the two communication pins, and wherein after the UART interfaces receive a specific pulse waveform sent by the mobile terminal, the controlling unit is configured to disconnect the two communication pins of the charging interface from each other, configure the UART interfaces to function as a communication interface, and conduct UART communication information with the mobile terminal.

17. The DC-charging power source adaptor according to claim 15, wherein the controlling unit is configured to:
disconnect the two communication pins from each other after a connection between the charging interface and the mobile terminal is detected and a preset period of time is delayed; and send a UART communication command on its own initiative to the mobile terminal to exchange a handshake instruction therewith or wait for reception of a UART communication command sent by the mobile terminal, and feedback a response command to complete a handshake upon reception of the UART communication command; and wherein the preset period of time is determined as a function of a period of time when the mobile terminal detects an external device being inserted to when the mobile terminal detects differential data pins of the mobile terminal are shorted.

18. The DC-charging power source adaptor according to claim 15, further comprising two signal lines connected with the two communication pins and a switch connected across the two signal lines, wherein the control unit is configured to control the switch to close or open to short or disconnect the two communication pins.

19. The DC-charging power source adaptor according to claim 15, wherein the AC to DC converting unit further comprises:
an optical coupler connected between the synchronous rectification controller and the PWM controller, and configured to optic-electrically isolate a signal output by the synchronous rectification controller; and
a power MOS transistor connected between a cathode of the secondary coil of the transformer and the ground pin of the charging interface, wherein the synchronous rectification controller is configured to control the power MOS transistor to switch on or off to rectify the charging voltage output by the transformer.

20. The DC-charging power source adaptor according to claim 15, wherein the controlling unit further comprises:
a switch transistor configured to support a large current to pass, wherein a switch path of the switch transistor is connected in a transmission line of the charging voltage; and
a boosting circuit connected with the controller, and configured to, upon reception of a valid enable signal output by the controller, output a higher switch voltage than the volt value of the charging voltage to a control pole of the switch transistor to control the switch transistor to connect the transmission line of the charging voltage.

* * * * *